W. N. SPRAGUE.

Assignor to SELF & W. W. POTTER.

Manufacture of Stiffeners for Boots and Shoes.

No. 8,184. Reissued April 16, 1878.

Witnesses.

A. Hunnewadel

W. J. Pratt.

Inventor.

Watson N. Sprague by Crosby & Gregory Attys

N. PETERS, PHOTO-LITHOGRAPHER, WASHINGTON, D. C.

UNITED STATES PATENT OFFICE.

WATSON N. SPRAGUE, OF SOUTH FRAMINGHAM, MASSACHUSETTS, ASSIGNOR TO HIMSELF AND WM. W. POTTER.

IMPROVEMENT IN MANUFACTURE OF STIFFENERS FOR BOOTS AND SHOES.

Specification forming part of Letters Patent No. 174,164, dated February 29, 1876; Reissue No. 8,184, dated April 16, 1878; application filed March 13, 1878.

*To all whom it may concern:*

Be it known that I, WATSON N. SPRAGUE, of South Framingham, county of Middlesex, and State of Massachusetts, have made a new and useful invention having reference to the Manufacturing of Shank-Pieces or Stiffeners for the Soles of Boots or Shoes; and I do hereby declare the same to be fully described in the following specification and represented in the accompanying drawings, of which—

Figure 1:
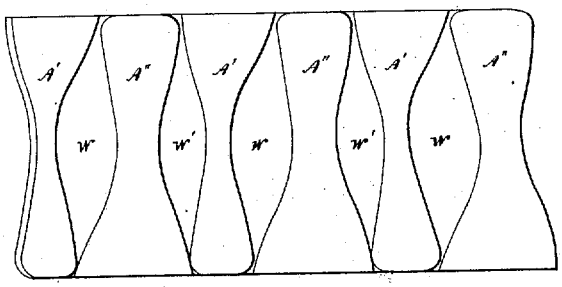
Figure 2:
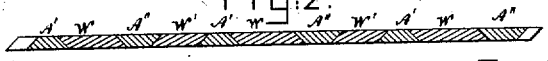
Figure 3:
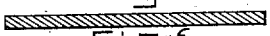
Figure 6:
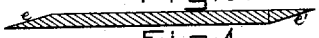
Figure 4:
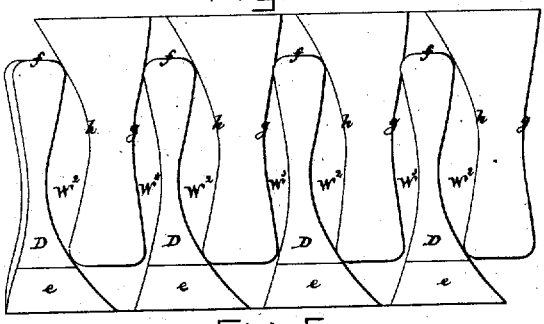
Figure 5:
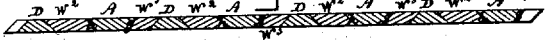
Figure 7:
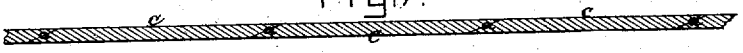
Figure 8:
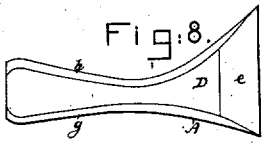

Figure 1 denotes a top view; Fig. 2, a transverse section of a strip of leather-board or other suitable material as cut in the way heretofore practiced for conversion of it into shank-stiffeners. Fig. 4 represents a top view; Fig. 5, a longitudinal section; Fig. 6, a transverse section of a sheet of like size of leather-board or other suitable material as cut in accordance with my improvement, or my new method of separating it into shank-stiffeners; Fig. 7, a sheet of leather-board or other material cut into strips according to my invention; Fig. 8, an under-side view of a stiffener cut out after my method, and Fig. 9 a transverse section thereof.

By my invention I am enabled to obtain from a strip of material of any given size about thirty-three per cent. more of the stiffeners than by the old method shown in Fig. 1—that is, with my mode of cutting the sheet, as represented in Fig. 4, I get eight of the stiffeners, whereas by that exhibited in Fig. 1 six only can be obtained from a sheet.

The two sheets represented in Figs. 1 and 4 are to be supposed to be equal in length; but although the sheet Fig. 4 is wider than that of Fig. 1 by the width of a toe-scarf of a stiffener, each sheet has the same arc in transverse section, one section being a rectangle and the other a parallelogram of like base and altitude.

In the old plan of cutting, as shown in Fig. 1, the toe of each of the stiffeners A′ A″ has to be subsequently scarfed, the part cut off being waste. With my improved mode of cutting there is not such waste, for I separate the sheet, as at *a a*, Fig. 7, into strips having their opposite edges beveled from opposite sides, (see also Fig. 6, showing one only of the strips,) the scarfed edges *e e′* for the toes of the stiffeners being produced without waste of material.

In Fig. 1 the waste pieces between the stiffeners A′ A″ are represented at W W′, each piece W′ being less in size than each piece W, on account of the stiffeners A″ being "rights" and the stiffeners A′ being "lefts." In Fig. 4 the waste pieces shown at W″ W‴ are very much smaller than those shown in Fig. 1, the stiffeners in the latter figure being shown at A D.

Figure 9:
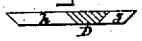

In carrying out this invention, the sheet of leather-board or other suitable material is first cut, as shown in Fig. 7, to form strips such as shown at Fig. 6, such strips having their edges scarfed at *e e′* to form the toes of the stiffeners, and then these strips are cut from edge to edge transversely on the curved lines *g h*, the cutting-instrument being so presented as to cut the strip slanting from one to its other side or face, in manner as shown in Fig. 5, so as to bevel each shank-stiffener along its opposite longer edges, as represented in Figs. 8 and 9. To square the stiffeners, cut the heels on the line *f*.

I claim—

1. The method herein described of forming shank-stiffeners for boots and shoes, consisting in first beveling or scarfing the opposite edges of a strip of leather-board at its opposite sides, as at *e e′*, to produce toe-forming ends, and then cutting through such strip transversely at an inclination to its face on curved lines *g h*, thereby dividing such scarfed strip into separate stiffeners, with scarfed toes wider than their heels, and with beveled sides, the toes of the stiffeners extending to each edge of the strip, substantially as shown and described.

2. The improved mode, substantially as herein described, of forming shank-stiffeners for boots and shoes, consisting in separating a sheet of leather-board or other material into strips having scarfed edges, then cutting through the strip transversely on the curved lines *g h*, and on the lines *f* in the opposite direction, thereby dividing the strip into separate stiffeners, beveled on their opposite longer edges, scarfed at their toes, and squared at their heels, essentially as shown and described.

WATSON N. SPRAGUE.

Witnesses:
G. W. GREGORY,
L. A. BAXTER.